Feb. 9, 1943.  W. T. HONISS  2,310,290
METHOD OF FEEDING MOLTEN GLASS IN PLURAL CHARGES
Filed Aug. 9, 1940
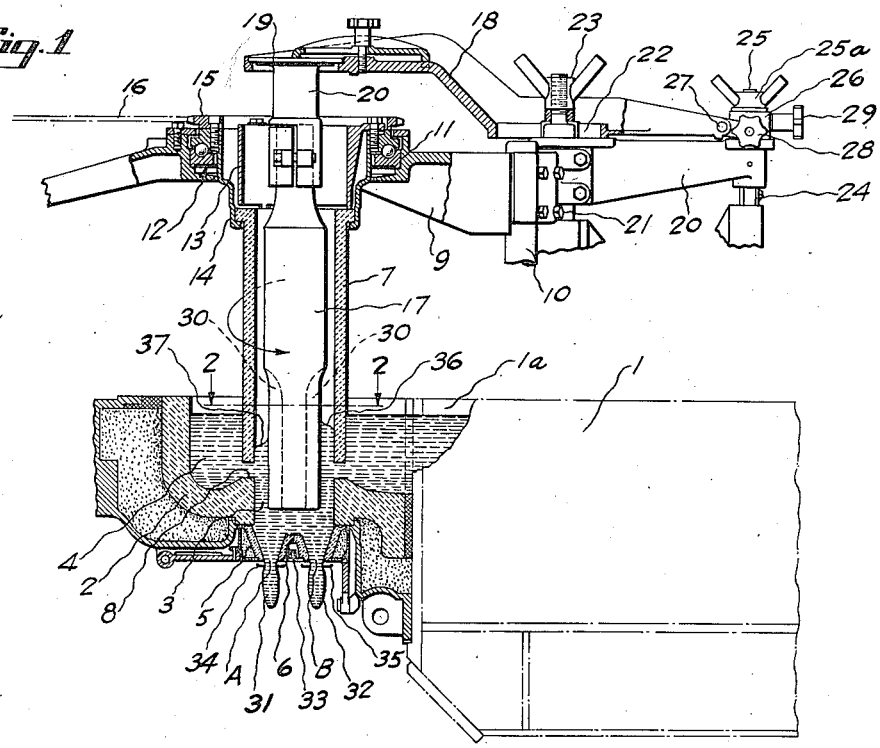
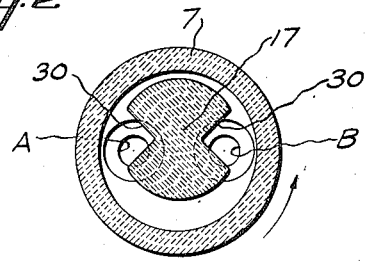
Inventor
William T. Honiss
by Brown & Parham
Attorneys Patented Feb. 9, 1943

2,310,290

UNITED STATES PATENT OFFICE 2,310,290

METHOD OF FEEDING MOLTEN GLASS IN PLURAL CHARGES

William T. Honiss, West Hartford, Conn., assignor to Hartford-Empire Company, Hartford, Conn., a corporation of Delaware Application August 9, 1940, Serial No. 351,936

7 Claims. (Cl. 49—77)

This invention relates to the art of feeding molten glass from a single glass feeder in a plurality of concurrently produced series of simultaneously formed and severed charges. The invention relates more particularly to the feeding of such charges by the use of a feeder having a glass feed chamber provided with a glass discharge well submerged by a supply body of molten glass and having at its bottom a pair of adjacent glass discharge orifices, such feeder also having a vertically adjustable tube depending into the glass in the chamber above the well, a vertically reciprocating plunger depending through the tube into the glass above said orifices for cooperating with the tube and the well to control the feeding of glass through the discharge orifices, and periodically operating severing means for severing charges simultaneously from concurrently formed suspended charge masses below the feeder discharge orifices.

An object of the invention is to provide an efficient, flexible and reliable method for regulably controlling the sizes of the masses of glass which will accumulate in suspension from the discharge orifices of such a feeder during each interval of time between successive charge severing operations by the associate severing means and hence to regulably control the relative weights of the several charges severed from these masses at each of such severing operations.

A more specific object of the invention is to regulably control the relative weights of the simultaneously severed charges produced by such a feeder by regulably controlling the relative amounts of glass passing downwardly in the discharge well of the feeder to the several discharge orifices during each of the glass discharge periods involved in the operation of the feeder.

A further object of the invention is to provide a method of the character described which can be employed during the continued operation of the feeder to regulate the relative weights of subsequent charges so that the effect of each such regulation can be observed.

The relative weights of the charges obtained concurrently by the feeding of glass through a plurality, as for example, two adjacent discharge orifices of a feeder, are governed by numerous factors and conditions. Among these are the relative temperatures and viscosities of different portions of the glass supply body in the portions of the well above the respective discharge orifices or passing to such portions of the well, the relative sizes of the discharge orifices, the relative times of severance of charges from suspended masses of glass below the several orifices, and the distances from the orifices at which such charges are severed. Assuming severance of the several charges simultaneously at like distances below the discharge orifices and like conditions of temperature and viscosity in the different portions of the glass above the several orifices and passing to the portions of the well above these orifices, charges of equal weight theoretically would always be obtained by the simultaneous severing operations. Actually, these conditions, particularly the temperatures of different portions of glass passing to and in different portions of the well above the orifices, may vary during operation of the feeder, causing objectionable and sometimes prohibitive variations between the weights of the several concurrently produced charges which are intended to have the same weight.

I have discovered that by employing rotation of the tube which by its position with respect to the rim or top of the well controls flow of glass to the well and by relative lateral adjustment between the reciprocating plunger and this tube in a feeder of the character described, I can compensate for such changes in the weight-controlling conditions above referred to so as to regulate the relative weights of the charges obtained sufficiently to maintain uniformity of the weights of the several charges despite the changing conditions. Also, if the concurrently produced charges are to be of different weights, the rotation of the tube and the relative lateral adjustment between the tube and the plunger can be employed to maintain the desired differential between the weights of the charges.

These and other advantages and novel features of the invention will be understood from the following description of the use of the method of the invention in connection with the feeding of plural charges by a feeder of the character described, portions of which are shown in the accompanying drawing, in which:

Figure 1 is a view, partly in side elevation, with portions shown in section, of a feeder equipped with mechanism appropriate for carrying out the method of the invention; and Fig. 2 is a section through the tube and plunger of the feeder shown in Fig. 1, looking downward at the bottom of the discharge well, the molten glass and the remaining parts of the feeder being omitted.

A feeder of the character hereinbefore described and as partially shown in Fig. 1 may comprise a forehearth 1 having a glass feed bowl or container 2. A glass discharge well 3 is located at the bottom of the container 2 beneath a substantially constant level body of molten glass 4 which is supplied to the feeding container by the forehearth flow channel 1—a from a glass melting furnace (not shown). The well 3 may comprise a suitable vertical opening in the bottom of the container 2, supplemented by the cavity of a subjacent removable orifice ring 5. This orifice ring is formed to provide a pair of adjacent discharge orifices, respectively designated A and B, at the bottom of the well, these orifices preferably being spaced apart longitudinally of the feeding container by a transversely extending division wall 6 at the bottom of the well. A refractory tube 7 depends into the molten glass in the feeding container above the well 3 and is vertically adjustable in relation to the rim or upper end of the well so that an annular passage 8 of greater or less depth will be provided for the flow of molten glass from the supply body proper into the well and into the lower portion of the tube 7.

The means for adjustably supporting and operating the tube 7 may comprise a substantially horizontal arm 9 on a vertically adjustable vertical shaft 10, such as are employed in the Hartford-Empire single feeder, and substantially as shown in Patent No. 1,735,837 of Nov. 12, 1929, to K. E. Peiler. This arm 9 may be formed to provide an annular housing 11 in which an antifriction bearing unit 12 is mounted. The bearing unit includes cooperative rotary clamping members 13 and 14, respectively, of generally annular form, engaged with the flanged upper end portion of the tube 7 for supporting and rotating the latter about its own axis. The rotary part of the bearing unit 12 may be rotated in the housing 11 to effect rotation of the tube 7 about its own axis in any suitable known way, such for example, as by the means shown in the aforesaid Peiler Patent No. 1,735,837 or by a sprocket, indicated at 15 in Fig. 1, connected rigidly with the clamping members 13, 14 of the bearing unit to rotate them and the tube 7 when the sprocket is rotated. This may be accomplished by means of a chain drive, diagrammatically indicated at 16. Any other suitable known mechanism may be provided for rotating the tube 7 about its own axis while supporting it with its lower end at a predetermined variable height above the rim or upper end of the well 3.

A plunger cooperative with the tube and the well for controlling feeding of glass through the orifices A and B is indicated at 17 and may be supported and reciprocated vertically by supporting and operating mechanism such as is included in the Hartford-Empire single feeder. Portions of this plunger supporting and operating mechanism are shown in Fig. 1, also in the aforesaid Peiler Patent No. 1,735,837 and in detail in Patent No. 1,760,254, granted to Peiler on May 27, 1930. This supporting and operating mechanism comprises a carrying arm 18 having an apertured end portion in which is clamped the flanged upper end portion 19 of a chuck or holder 20 by which the upper end portion of the plunger 17 is gripped and supported.

The arm 18 is adjustable horizontally in the direction of length thereof and also in opposite directions substantially at right angles to its direction of length. As shown, the arm 18 is carried on a bracket 20 that is mounted on a guided vertically reciprocating shaft 21. The upper portion of the shaft 21 extends through a slotted portion 22 of the arm 18 and is engaged above the arm by a wing nut 23. The bracket 20 is guided in its vertical reciprocations by a depending guided vertical guide post 24. This bracket also carries an upstanding vertical post 25. A square collar 26 surrounds this post 25 and is connected with an end portion of the arm 18 by a horizontal hinge or pivot pin 27. A wing nut 25—a is provided on the post 25 above the collar 26. A lateral hand screw, indicated at 28, and a rear hand screw 29 are journaled in the walls of the collar 26 and are threaded into the post 25. When the wing nut 23 has been loosened, the arm 18 may be adjusted on the bracket 20 in the direction of its length by turning the rear screw 29. This will effect a fore and aft adjustment of the plunger 17 in relation to the tube 7 and to the walls of the well 3. Lateral adjustment of the plunger 17 in relation to the same parts may be effected, when the wing nut 23 has been loosened, by adjusting the lateral hand screw 28 and also the rear hand screw 29 if the lateral adjustment of the plunger is to be effected in a straight line transversely of the feeding container.

The means for reciprocating the vertical shaft 21 and the parts supported thereby, as above described, may be as disclosed in the Peiler Patent No. 1,760,254, or any other suitable known mechanism for this purpose may be employed.

The details of the particular plunger operating and supporting mechanism and of the particular mechanism for supporting and rotating the tube do not, per se, form part of the present invention and they may vary widely from those shown in Fig. 1 or in either of the Peiler patents hereinbefore referred to. It will be understood that such a mechanism should provide for or permit various adjustments of the plunger and of its movements during the operation of the feeder, as in the case of the mechanism of Patent 1,760,254.

The plunger preferred by me has the lower end portion thereof formed to have a configuration in cross section substantially like that of the figure 8 from the lower end of the plunger to a level located a substantial distance up into the tube 7 when the device is in use. A plunger of this description is supported so that the vertical grooves, recesses or concavities, indicated at 30 in the opposite sides thereof, are turned toward the orifices A and B respectively. The horizontal distance between the deepest portions of the vertical grooves in the side walls of the plunger preferably is less or not substantially greater than the corresponding distance between the bottom ends of the discharge orifices so that but little, if any, of the bottom wall of the plunger will overlie either of these discharge orifices when the plunger is in centered relation in the well. This shape of plunger and its position in the well are beneficial in obviating differential impulses on the glass passing through adjacent and more remote portions, respectively, of the orifices. Such differential impulses would tend to cause the accumulating mold charge masses, such as those indicated at 31 and 32 respectively, to warp or cant away from each other at their lower ends as they accumulate in suspension below the orifice. This tendency of the charges to warp or cant away from each other may be opposed by other means, as by means for locally cooling the bottom of the division wall between the orifices, as at 33, as explained in detail in the copending application of William T. Barker, Serial No. 284,391, filed July 14, 1939, which is owned by the owner of the present application. Plungers having lower end portions of various shapes in cross sectional configuration therefore may be used instead of a plunger having a shape substantially as shown in the drawing and as now preferred by me.

Severance of charges from the suspended masses beneath the respective orifices may be effected by suitable severing mechanism, which is represented diagrammatically by the shear blades 34 and 35. Such a severing mechanism may have any suitable known structure and particular mode of operation.

In carrying out the method of the invention in connection with the operation of a feeder, substantially as described, the plunger 17 may be adjusted to reciprocate in centered or concentric relation with the well 3 when conditions of temperature and viscosity of the glass passing to the well will permit. Assuming symmetrical conditions of temperature and viscosity angularly around the vertical center line of the well, this arrangement will provide for the production of charges of like weight when the severing mechanism is operated to effect simultaneous severance of charges from the suspended masses beneath the respective outlets. However, should the weights of these charges become unequal, as because of temperature and viscosity differences between different portions of glass in different portions of the well, as may happen at any time, a correction may be effected by shifting the plunger 17 laterally with relation to the tube or in other words along a line extending at approximately a right angle with the horizontal line between the centers of the orifices. This adjustment will be effective in cooperation with the rotation of the tube 7 to provide different heights or heads of the glass in the tube above the several discharge orifices. Thus, with the tube rotating counter-clockwise, as shown in Figs. 1 and 2, and the plunger adjusted laterally toward far side of the container 2, as shown in Fig. 1, or toward the top of the sheet as shown in Fig. 2, the head of glass 36 within the lower portion of the tube, vertically above the orifice B, will have a greater average height than the head of glass, indicated at 37, over the orifice A. This probably is due to the constriction of a portion of the passage between the plunger and tube so that rotary movement of glass in the tube as the tube rotates is opposed at the place and to the extent required to cause the building up of a greater head of glass in the portion of the tube above the orifice B. An opposite effect will be produced in the portion of the tube above the orifice A so that the head there will be relatively lower than when the plunger is centered in the tube.

The direction of the lateral adjustment of the plunger will of course vary according to the location of the cooler and more viscous glass at the front or the rear of the well. The extent of such lateral adjustment will vary according to the change in the condition which makes the adjustment necessary. The total weight of glass for the plural charges is controlled, at least in part, by the vertical adjustment of the tube with respect to the rim or top of the well while the relative lateral adjustment between the plunger and the tube controls the relation between the rates of flow or movement of glass downwardly in the well to the discharge orifices and thus provides a corrective control or regulation of the relation between the weights of the severed charges. The average depth of glass within the tube depends on the relation between the size of the discharge orifices and the height above the rim or top of the well at which the lower end of the tube is set, and is related to the weight of the mold charges. The tube should be set with relation to the rim or top of the well to provide a sufficient average depth of glass in the tube for coaction between the tube and the plunger to cause a substantial change of depth or head between portions of glass at angularly different places in the tube when the latter is rotated and the plunger has been adjusted laterally from a centered position in the tube.

I prefer to effect the relative lateral adjustments between the plunger and the tube for regulation of the relative weights of the charges which are produced simultaneously by the feeder by adjusting the plunger laterally relative to the tube. If desired, however, provision may be made to effect such relative lateral adjustments by adjusting the tube laterally relative to the plunger.

Certain subject matters of invention which are disclosed but not claimed herein are also disclosed and are claimed in the aforesaid application of William T. Barker, Serial No. 284,391, filed July 14, 1939.

I claim:

1. The method of feeding molten glass from a supply body in a feeding container through a plurality of adjacent discharge orifices in the bottom of a well that is submerged by the glass in the container, comprising the steps of controlling the flow of glass from the supply body into the upper end of the well by disposing an open bottomed rotary vertical tube in the container above the well with the open lower end of said tube depending into the supply body to a predetermined distance above the upper end of the well, controlling the discharge of glass from the well through said orifices by reciprocating a plunger vertically in the glass above said orifices with the lower end portion of the plunger depending through said tube in spaced relation therewith, regulating the relative weights of glass discharging from said orifices and accumulating in suspension below said orifices during each of successive predetermined periods of time by rotating the tube and regulating the radial distances between angularly different lateral surfaces of the plunger and the surrounding, rotating tube to regulate the relative heads of glass in the different portions of the tube above the respective discharge orifices to compensate for differences of temperature between the different portions of glass respectively passing from the supply body downwardly in the well toward the respective orifices, and severing charges from the suspended masses below the several orifices at the end of each of said periods of time.

2. The method of regulating the relative weights of mold charges which are obtained by severing such charges from masses of molten glass in suspension from adjacent discharge orifices in the bottom of a well submerged by molten glass of a supply body in a feeding container, the flow of glass from the supply body to the well being under the control of a vertical rotary tube having its lower end located in the supply body at a predetermined distance above the upper end of the well and the issuance of glass from the well through the orifices to form said suspended masses being under the control of a reciprocating vertical implement depending through said tube in spaced relation therewith into the glass above said orifices, which comprises rotating the tube about its own axis, and effecting relative lateral adjustment between the rotating tube and the reciprocating implement to cause different heads of glass in the tube over the respective orifices when the temperature of the glass streams passing downward in angularly different portions of the well to the respective orifices are different, and severing charges of substantially like weight from the suspended masses produced below said orifices.

3. The method of regulating the relative weights of mold charges which are obtained by severing such charges from masses of molten glass in suspension from adjacent discharge orifices in the bottom of a well submerged by molten glass of a supply body in a feeding container, the flow of glass from the supply body to the well being under the control of a vertical rotary tube having its lower end located in the supply body at a predetermined distance above the upper end of the well and the issuance of glass from the well through the orifices to form said suspended masses being under the control of a reciprocating vertical implement depending through said tube in spaced relation therewith into the glass above said orifices, which comprises rotating the tube about its own axis, and effecting relative lateral adjustment between the rotating tube and the reciprocating implement to cause a differential between the heads of glass in the angularly different portions of the tube above the respective orifices to compensate for unequal viscosities of the different portions of glass passing from the supply body to the respective orifices, whereby substantially similar suspended mold charge masses will be formed beneath these orifices in a given period of time despite said unequal viscosities, and severing charges of substantially like weight from said suspended masses.

4. A method according to claim 2 in which the relative lateral adjustment between the rotating tube and the plunger is effected by shifting the plunger bodily relatively to the tube.

5. A method according to claim 2 in which the relative lateral adjustment between the plunger and the tube is effected by shifting the plunger laterally relative to the tube in a direction extending substantially at a right angle with the direction of a line between the centers of said adjacent discharge orifices.

6. The method of controlling the feed of glass of different temperatures flowing from a source of supply for discharge through two adjacent outlets under control of a vertical implement normally in axial alinement with a point midway on a horizontal line between the centers of said outlets and a rotating tube surrounding said implement and normally in substantially spaced concentric relation therewith, which consists in effecting a relative lateral adjustment between said implement and said tube by shifting one of them laterally from its said normal position and with relation to the other to effect a relative acceleration of flow of the cooler glass to its outlet with respect to the rate of flow of the hotter glass to its outlet.

7. The method of controlling the feed of glass of different temperatures flowing from a source of supply for discharge through two adjacent outlets under control of a vertical implement normally in axial alinement with a point midway on a horizontal line between the centers of said outlets and a rotating tube surrounding said implement and normally in substantially spaced concentric relation therewith, which consists in shifting said implement laterally from its normal position and with respect to the tube along a line extending substantially at a right angle to the direction of said horizontal line between the centers of said outlets to effect a relative acceleration of downward flow of the cooler glass to its outlet and a relative retardation of downward flow of the hotter glass to its outlet.

WILLIAM T. HONISS.